United States Patent
Mayhew et al.

(10) Patent No.: US 11,847,881 B2
(45) Date of Patent: Dec. 19, 2023

(54) VENDING MACHINE AND OPENING SYSTEMS AND METHODS

(71) Applicant: 24/7 Pizza Box, LLC, Sarasota, FL (US)

(72) Inventors: Peter Mayhew, Corona, CA (US); David Chessler, Sarasota, FL (US)

(73) Assignee: 24/7 PIZZA BOX, LLC, Sarasota, FL (US)

( * ) Notice: Subject to any disclaimer, the term of this patent is extended or adjusted under 35 U.S.C. 154(b) by 227 days.

(21) Appl. No.: 17/522,002

(22) Filed: Nov. 9, 2021

(65) Prior Publication Data

US 2022/0148361 A1 May 12, 2022

Related U.S. Application Data

(60) Provisional application No. 63/111,239, filed on Nov. 9, 2020.

(51) Int. Cl.
   *G07F 17/00* (2006.01)
   *B65G 1/137* (2006.01)
   *F24C 15/16* (2006.01)
   *B65G 1/06* (2006.01)

(52) U.S. Cl.
   CPC ........... *G07F 17/0071* (2013.01); *B65G 1/06* (2013.01); *B65G 1/137* (2013.01); *F24C 15/16* (2013.01)

(58) Field of Classification Search
   CPC .................................................. G07F 17/0071
   USPC .................................................... 221/150 HC
   See application file for complete search history.

(56) References Cited

U.S. PATENT DOCUMENTS

| | | | | |
|---|---|---|---|---|
| 5,168,795 | A | * | 12/1992 | Okada ................. G07F 17/0085 99/336 |
| 5,582,758 | A |   | 12/1996 | Smith et al. |
| 5,799,822 | A | * | 9/1998 | Rudewicz .............. H05B 6/808 219/678 |

(Continued)

FOREIGN PATENT DOCUMENTS

WO          2008144824 A1   12/2008

OTHER PUBLICATIONS

International Search Report and Written Opinion for PCT/US2021/058530 dated Feb. 7, 2022 (15 pages).

*Primary Examiner* — Gene O Crawford
*Assistant Examiner* — Ayodeji T Ojofeitimi
(74) *Attorney, Agent, or Firm* — Shumaker, Loop & Kendrick, LLP

(57) ABSTRACT

A vending machine system adapted to open and prepare a contained food item. The system includes a cabinet, a rack frame supported relative to the cabinet, a shelf coupled to the rack frame and configured to support a contained food item, a lid removal apparatus supported relative to the rack frame, and a food item actuator supported relative to the rack frame. The cabinet includes a refrigerated compartment housing the rack frame and a partition separating and selectively allowing access between the refrigerated compartment and a preparation compartment. The lid removal apparatus is configured to selectively retain a lid of the contained food item. The food item actuator is configured to move a container of the contained food item to the preparation compartment of the cabinet while the lid of the contained food item is retained by the lid removal apparatus subsequent to translation of the container.

19 Claims, 14 Drawing Sheets

(56) References Cited

U.S. PATENT DOCUMENTS

| | | | |
|---|---|---|---|
| 2001/0002674 A1* | 6/2001 | Gubbini | A21C 9/08 221/13 |
| 2008/0099501 A1 | 5/2008 | Ward | |
| 2010/0025422 A1* | 2/2010 | Bjornvall | G07F 11/10 219/756 |

* cited by examiner

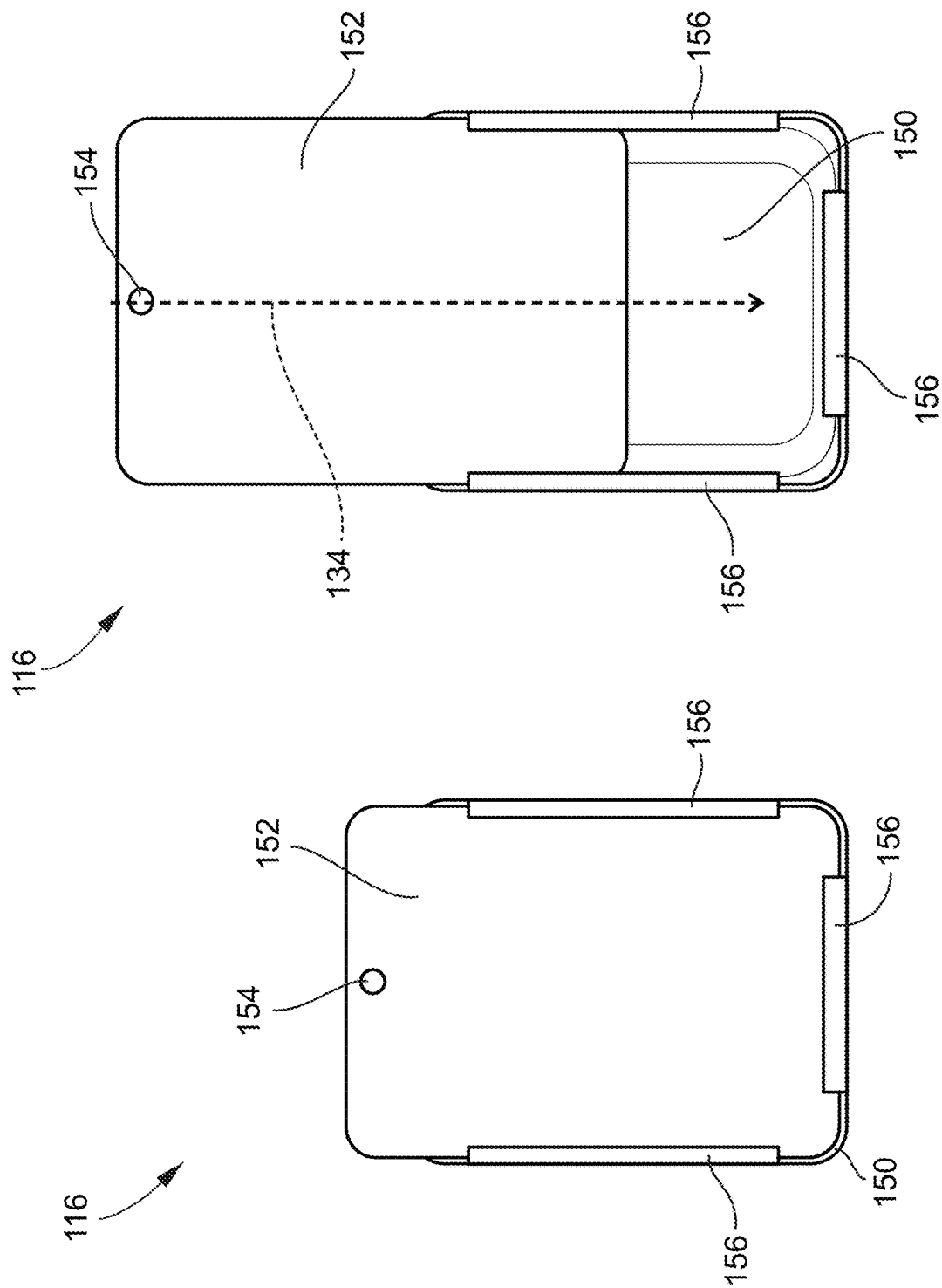

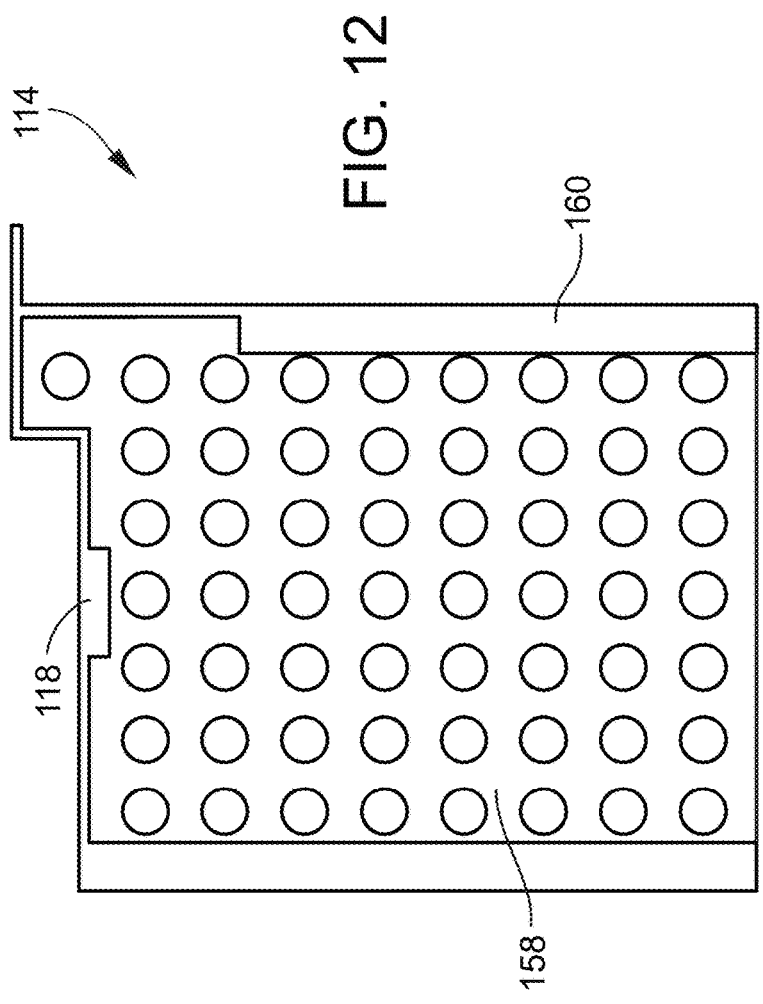
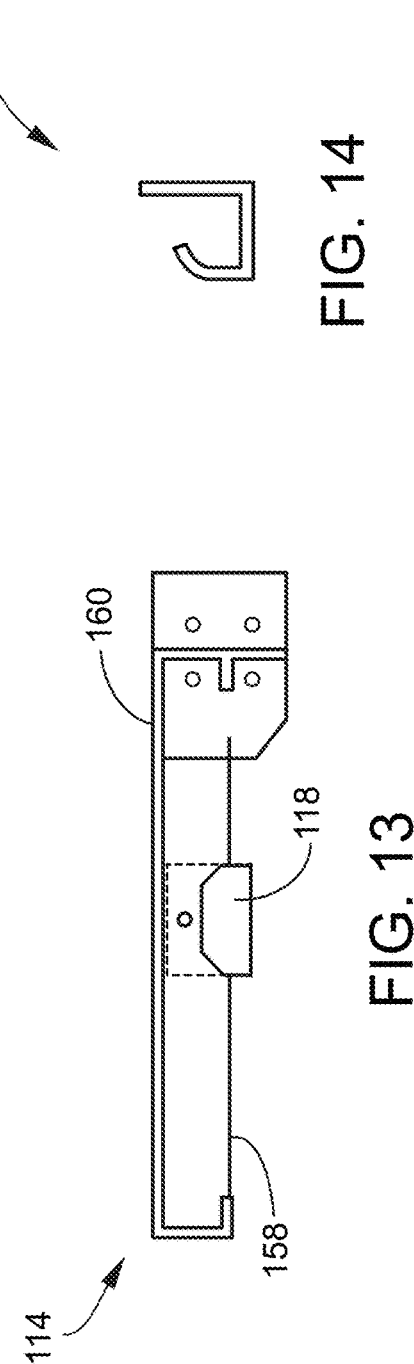

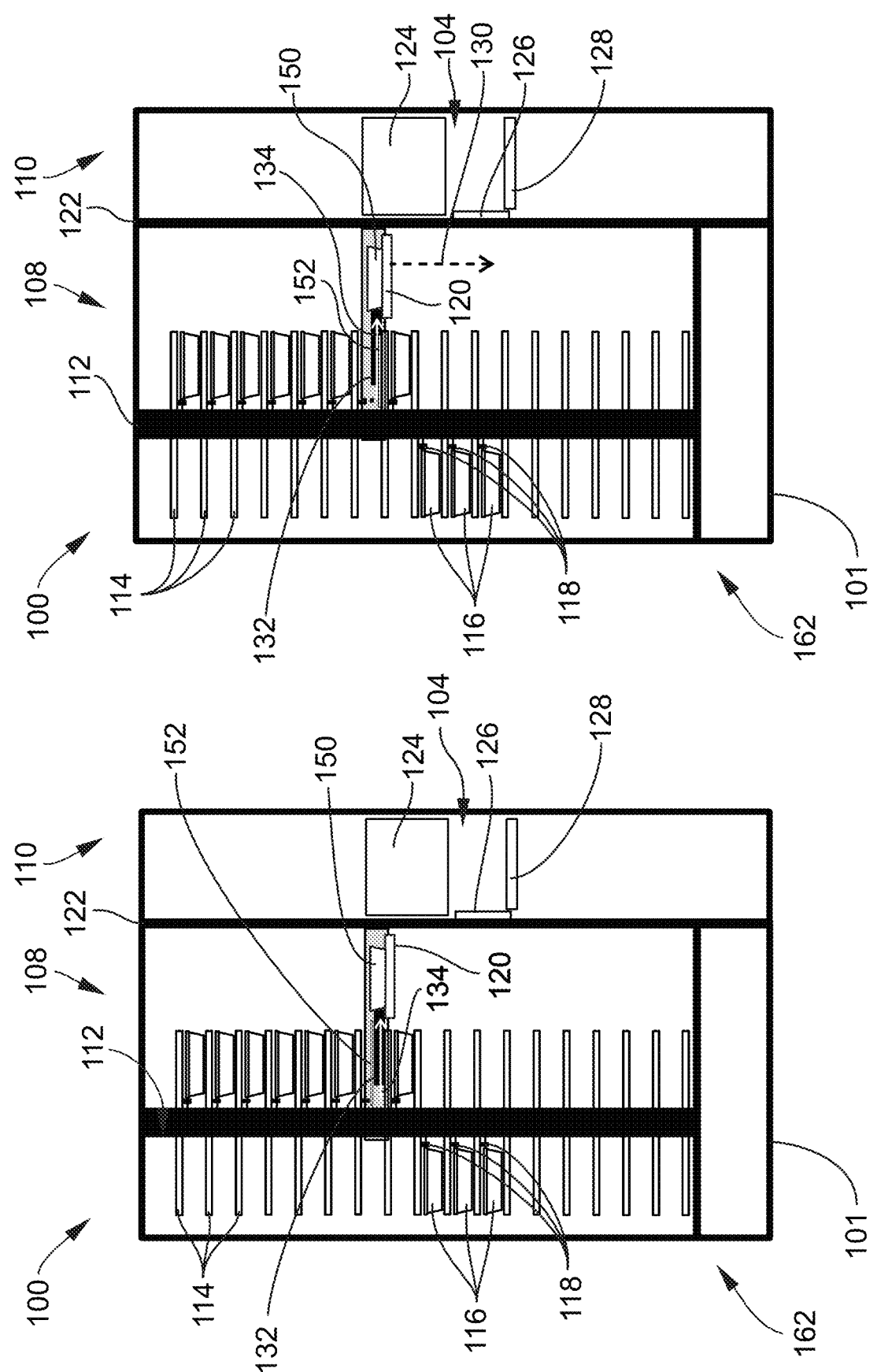

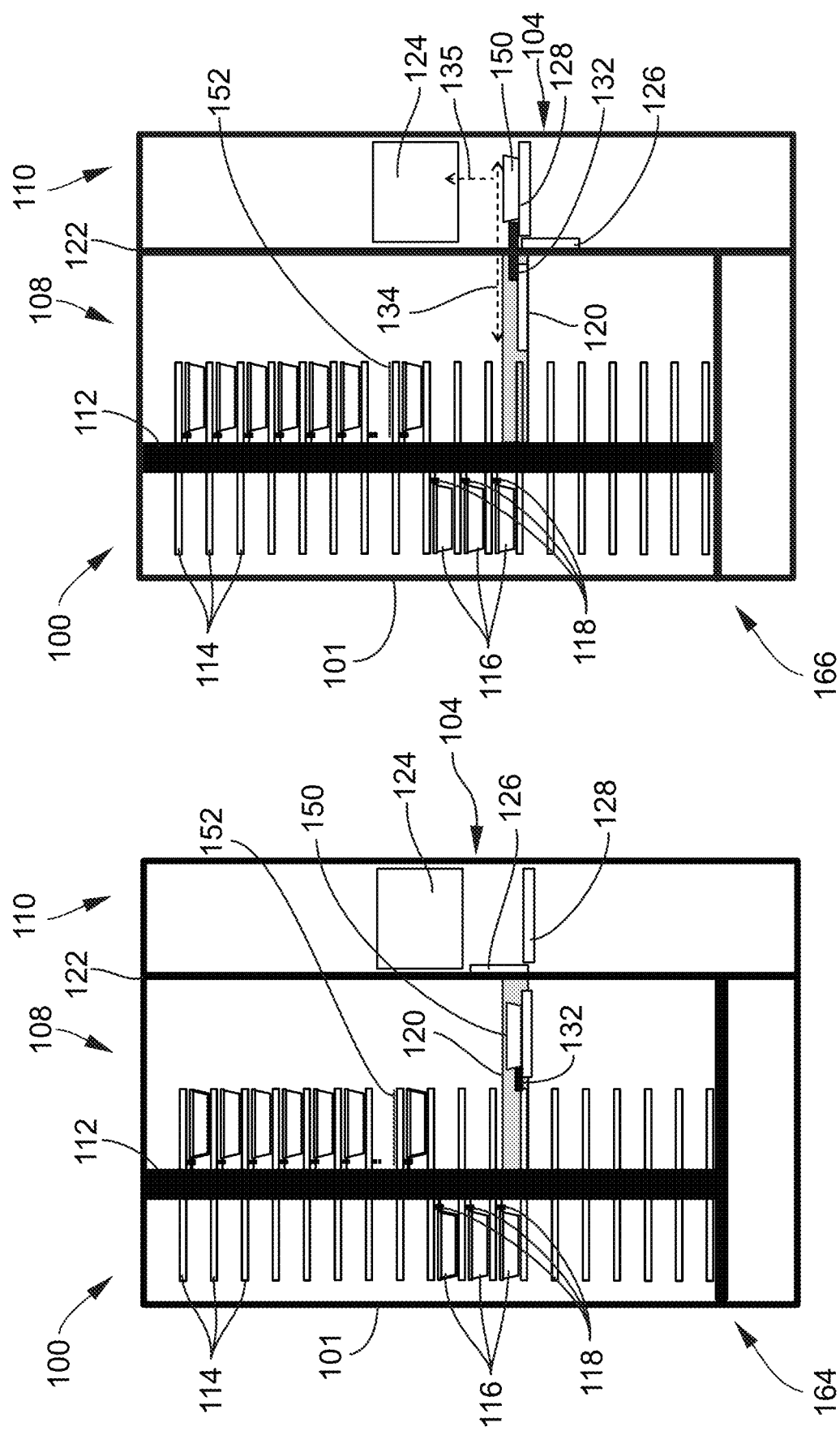

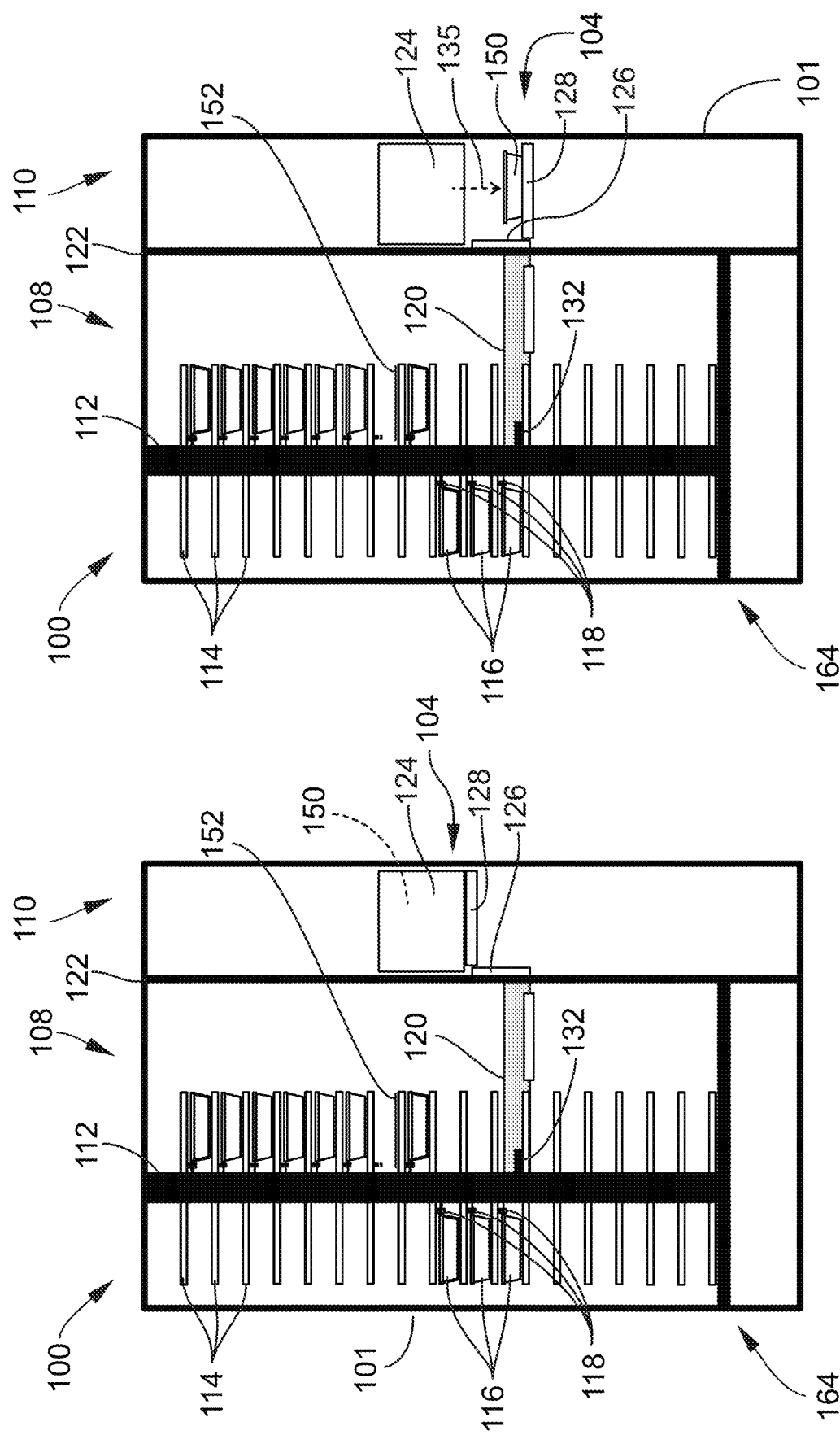

VENDING MACHINE AND OPENING SYSTEMS AND METHODS

TECHNICAL FIELD AND BACKGROUND

The present invention relates generally to the field of vending machines for dispensing food items, and more particularly, to an on-demand vending machine for dispensing and cooking opened food items that were loaded and stored in a closed container.

Conventional vending machines for dispensing food items typically include a refrigeration component for preventing spoilage, a heating component for heating food items to a servable temperature, a food handler for transitioning food items within the machine, a dispenser for dispensing the food items, and a transaction component for processing payment. Conventional vending machines for dispensing food items are typically stocked with factory prepared, pre-packaged foods items. Such food items are generally pre-cooked and/or contain sufficiently low levels of undesirable bacteria, viruses, contaminates, and the like to be safe for human consumption, either with or without heating to a servable temperature. Such food items, while often long lasting, lack the freshness of locally prepared food and therefore are less desirable to a consumer. Further, vending machines stocked with factory prepared food items require package removal components for removing the food item from the packaging and/or protective film covering prior to heating, which adds cost and complexity to the vending machine. Generally, vending machines capable of provided heated food items are associated with a microwave. However, microwaves are generally suitable for raising the temperature of food items but do not provide an appealing and appetizing sear to the food items.

In an effort to improve food quality, vending machines have been developed that prepare and cook food items "on-demand" using pre-packaged ingredients. While these machines are an improvement in terms of freshness, there are inherent complexities and disadvantages associated with handling ingredients, complex food preparation, and time required to prepare the food. Further, pre-packaged ingredients typically also require package removal in order to be heated to a sanitary or cooked temperature (e.g., to contain sufficiently low levels of undesirable bacteria, viruses, contaminates, etc.). Additionally, the included package on standard vending machine food items prevents searing to food items and/or ingredients using other means.

Therefore, to overcome the disadvantages of prior vending machines for dispensing food items, what is needed is a vending machine configured to dispense precontained food items and/or uncooked food items in an efficient and sanitary manner. Such a vending machine would provide fresh, hot food cooked to order; increase sales; automate food service; and reduce the possibility of foodborne illnesses, among other advantages.

BRIEF SUMMARY

In one aspect, the present subject matter is directed to a vending machine system adapted to open and prepare a contained food item. The system includes a cabinet, a rack frame supported relative to the cabinet, a shelf coupled to the rack frame and configured to support the contained food item, a lid removal apparatus supported relative to the rack frame, and a food item actuator supported relative to the rack frame. The cabinet includes a refrigerated compartment housing the rack frame, a preparation compartment, and a partition separating the refrigerated compartment and the preparation compartment. The partition selectively allows access between the refrigerated compartment and the preparation compartment. Further, the lid removal apparatus is configured to selectively retain a lid of the contained food item. The food item actuator includes an arm translatable relative to the lid removal apparatus. Moreover, the system is configured such that translation of the arm moves a container of the contained food item from the refrigerated compartment to the preparation compartment of the cabinet. The system is additionally configured such that the lid of the contained food item is retained by the lid removal apparatus subsequent to translation of the arm.

In at least one embodiment, the partition includes an actuatable divider configured to selectively actuate between one or more of a first orientation or position and one or more of a second orientation or position. In additional or alternative embodiments, the lid removal apparatus is coupled to the rack frame. In additional or alternative embodiments, the lid removal apparatus is coupled to the shelf. In additional or alternative embodiments, the lid removal apparatus includes a movable arm and a stationary arm. In at least one such embodiment, the movable arm of the lid removal apparatus is configured to actuate between a load position and an engagement position. In additional or alternative embodiments, the lid removal apparatus includes a protrusion configured to selectively engage with a through hole of the lid. In additional or alternative embodiments, the lid removal apparatus includes a hook structure configured to engage with a slot of the lid.

In additional or alternative embodiments, the food item actuator is coupled to the rack frame. In additional or alternative embodiments, the arm of the food item actuator is configured as a pusher arm. In additional or alternative embodiments, the system further includes an oven disposed within the preparation compartment of the cabinet. In at least one such embodiment, the oven is configured to raise a temperature of the food to a cooked temperature sufficient to reduce the risk of foodborne illness.

In an additional or alternative aspect, the present subject matter is directed to a vending machine system adapted to open and prepare contained food items. The system includes a cabinet, a rack frame supported relative to the cabinet, two or more shelves coupled to the rack frame, two or more lid removal apparatuses supported relative to the rack frame, an elevator supported relative to the rack frame, and a food item actuator supported relative to the rack frame. The cabinet includes a refrigerated compartment housing the rack frame, a preparation compartment, and a partition separating the refrigerated compartment and the preparation compartment. The partition is configured to selectively allow access between the refrigerated compartment and the preparation compartment at a passage position. Each shelf is configured to support an associated contained food item at an associated storage position. Each lid removal apparatus is configured to selectively retain a lid of the associated contained food item of an associated shelf. The elevator includes a support surface such that the elevator is configured to translate the support surface between the storage position of each shelf and the passage position. The food item actuator includes an arm translatable relative to each lid removal apparatus. Moreover, the system is configured such that translation of the arm relative to a selected lid removal apparatus moves a container of the associated contained food item from the associated shelf to the support surface of the elevator. The system is additionally configured such that the lid of the associated contained food item is retained by the selected lid removal apparatus of the associated shelf subsequent to translation of the arm.

In at least one embodiment, the food item actuator is further configured such that translation of the arm moves the container of the associated contained food item from the refrigerated compartment to the preparation compartment of the cabinet. In additional or alternative embodiments, the food item actuator is configured to translate with the elevator. In additional or alternative embodiments, the food item actuator is coupled to the elevator.

In additional or alternative embodiments, the system further includes an oven disposed within the preparation compartment of the cabinet. In at least one such embodiment, the oven is positioned at an oven location different than the passage position, and the system includes a preparation elevator positioned within the preparation compartment. The preparation elevator includes support surface and is configured to translate the support surface between the oven location and the passage position.

In additional or alternative embodiments, each lid removal apparatus of the plurality of lid removal apparatuses is coupled to the associated shelf of the plurality of shelves. In additional or alternative embodiments, each lid removal apparatus includes a hook structure configured to engage with a slot of the associated lid of the associated contained food item.

Embodiments of the inventive concepts can include one or more or any combination of the above aspects, features, and configurations.

Additional features, aspects, and advantages of the invention will be set forth in the detailed description that follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

A full and enabling disclosure of the present invention, including the best mode thereof, directed to one of ordinary skill in the art, is set forth in the specification, which makes reference to companying drawings. Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same, analogous, or similar elements, features, or functions. In the drawings:

FIG. 10 is a top schematic view of an exemplary contained food item in accordance with aspects of the present subject matter;

FIG. 11 is another, top schematic view of the contained food item being opened in accordance with aspects of the present subject matter;

FIG. 12 is a top schematic view of an exemplary shelf in accordance with aspects of the present subject matter;

FIG. 13 is a front schematic view of the shelf in accordance with aspects of the present subject matter;

FIG. 14 is a side schematic view of an additional or alternative lid removal apparatus in accordance with aspects of the present subject matter;

FIG. 19 is another, front schematic view of the interior of the vending machine in accordance with aspects of the present subject matter;

FIG. 20 is another, front schematic view of the interior of the vending machine in accordance with aspects of the present subject matter;

FIG. 21 is another, front schematic view of the interior of the vending machine in accordance with aspects of the present subject matter;

FIG. 22 is another, front schematic view of the interior of the vending machine in accordance with aspects of the present subject matter;

FIG. 23 is another, front schematic view of the interior of the vending machine in accordance with aspects of the present subject matter; and FIG. 24 is another, front schematic view of the interior of the vending machine in accordance with aspects of the present subject matter.

DETAILED DESCRIPTION OF EXEMPLARY EMBODIMENTS

Figure 1:
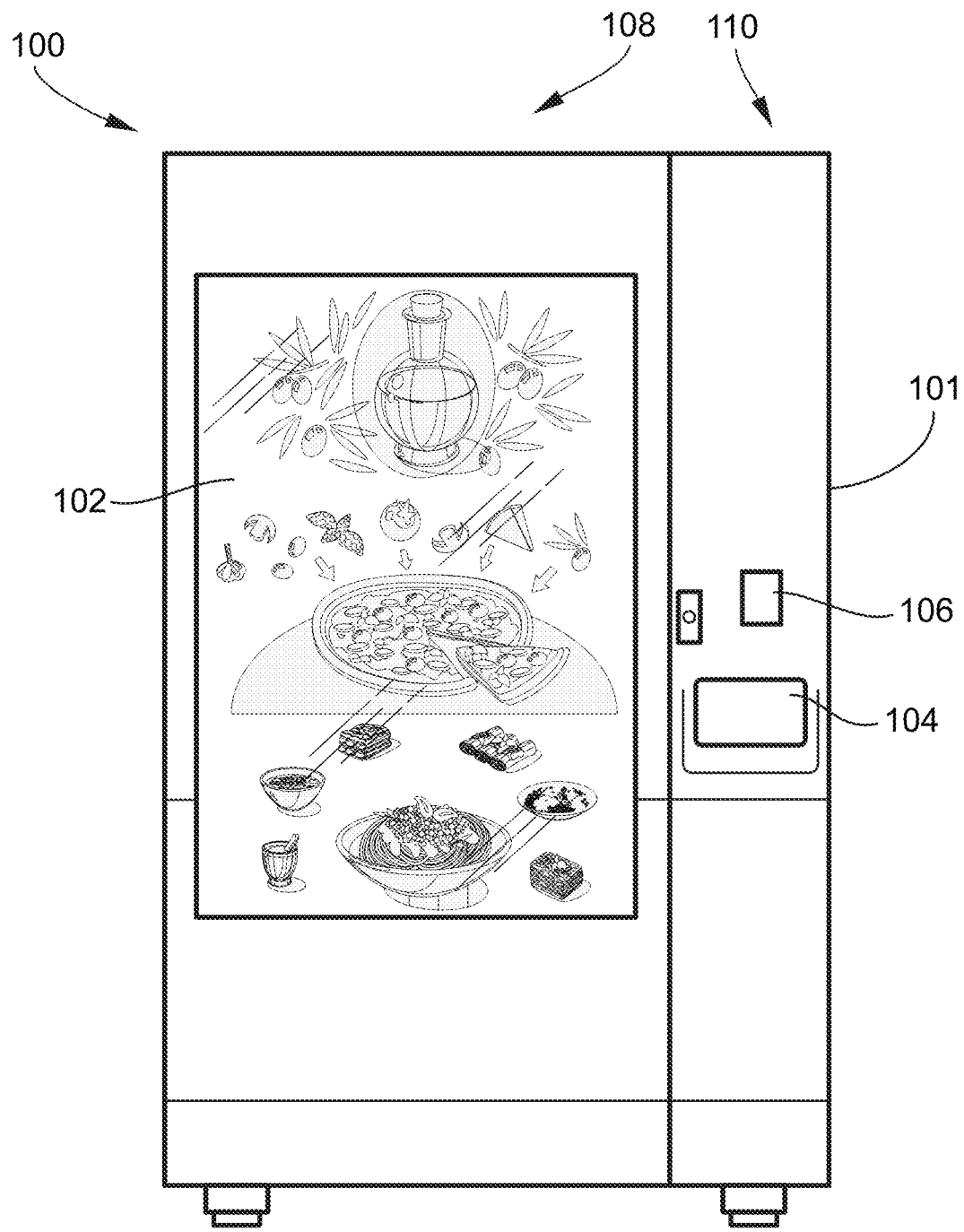
FIG. 1 is a front schematic view of an exterior of a vending machine in accordance with aspects of the present subject matter.

The inventive concepts are described hereinafter with reference to the accompanying drawings in which exemplary embodiments are shown. However, the inventive concepts may be embodied in many different forms and should not be construed as limited to the representative embodiments set forth herein. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. It is envisioned that other embodiments may perform similar functions and/or achieve similar results. Any and all such equivalent embodiments and examples are within the scope of the present invention and are intended to be covered by the appended claims.

The exemplary embodiments are provided so that this disclosure will be both thorough and complete, and will fully convey the scope of the invention and enable one of ordinary skill in the art to make, use, and practice the invention.

The terms "coupled," "fixed," "attached to," and the like refer to both direct coupling, fixing, or attaching, as well as indirect coupling, fixing, or attaching through one or more intermediate components or features, unless otherwise specified herein.

The inventive concepts disclosed herein are generally directed to vending machines for opening precontained food items and dispensing freshly prepared food items. In an exemplary embodiment, the vending machine may be an automated kiosk configured to open, bake, and dispense fresh food items to customers from uncooked, precontained food items. The vending machine generally includes a temperature-controlled refrigeration unit for storing precontained food items and a high-speed bake oven for heating the food items on-demand to a cooked temperature sufficient to reduce the risk of foodborne illness. The precontained food items may be opened utilizing one or more lid removal apparatuses and food item actuators. The food item actuator(s) may also move the opened food item to a preparation compartment, separate from the refrigeration compartment. The vending machine may include a partition that selectively allows opened food items to be moved from the compartment of the refrigeration unit to the preparation compartment, such as through a passage.

In exemplary capacities, the vending machine may hold several, such as dozens or more, precontained food items on shelves. The vending machine may include an elevator that transports the food items from the shelves to the passage in the partition. The partition may generally thermally insulate or isolate the refrigeration compartment from the preparation compartment, at least to a suitable degree. Further, the food item actuator may move the food items from the shelves to the elevator.

Once in the preparation compartment, the high-speed bake oven may raise the temperature of an opened food item to the cooked temperature. Disclosed vending machines and associated methods allow for baking uncooked food items to safe temperatures for human consumption. Disclosed vending machines may include an oven that utilizes multiple heating methods. For instance, a suitable oven may include a microwave unit and a convection unit, an infrared heating unit, or both. Generally, the microwave unit may be utilized to heat food items from the inside. The convection and/or infrared heating unit may be used to brown or sear the outside of food items. It should be appreciated that several exemplary vending machines disclosed here sequentially allow for a precontained food items to be opened (e.g., via removal of the lid via the lid removal apparatus) and then heated utilizing convection and/or infrared. Thus, the package or other container of the precontained food item does not prevent searing the food product. Further, disclosed vending machines are suitable to receive precontained food items and dispense opened, fresh, hot food items while reducing the risk of food contamination, improving overall sanitation, and increasing customer satisfaction.

Figure 2:
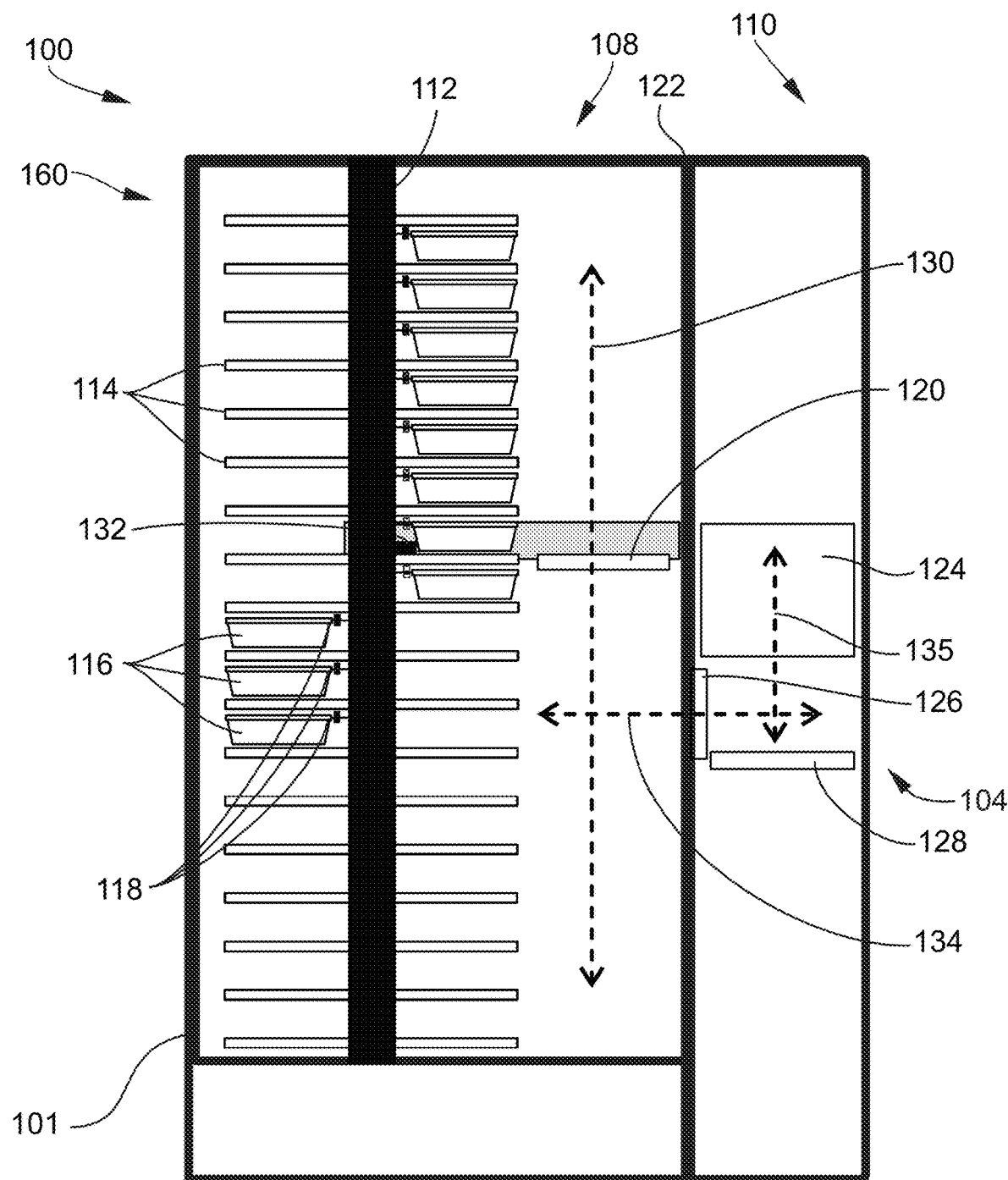
FIG. 2 is another, front schematic view of the interior of the vending machine, showing an internal refrigerated compartment and preparation compartment, in accordance with aspects of the present subject matter.
Figure 3:
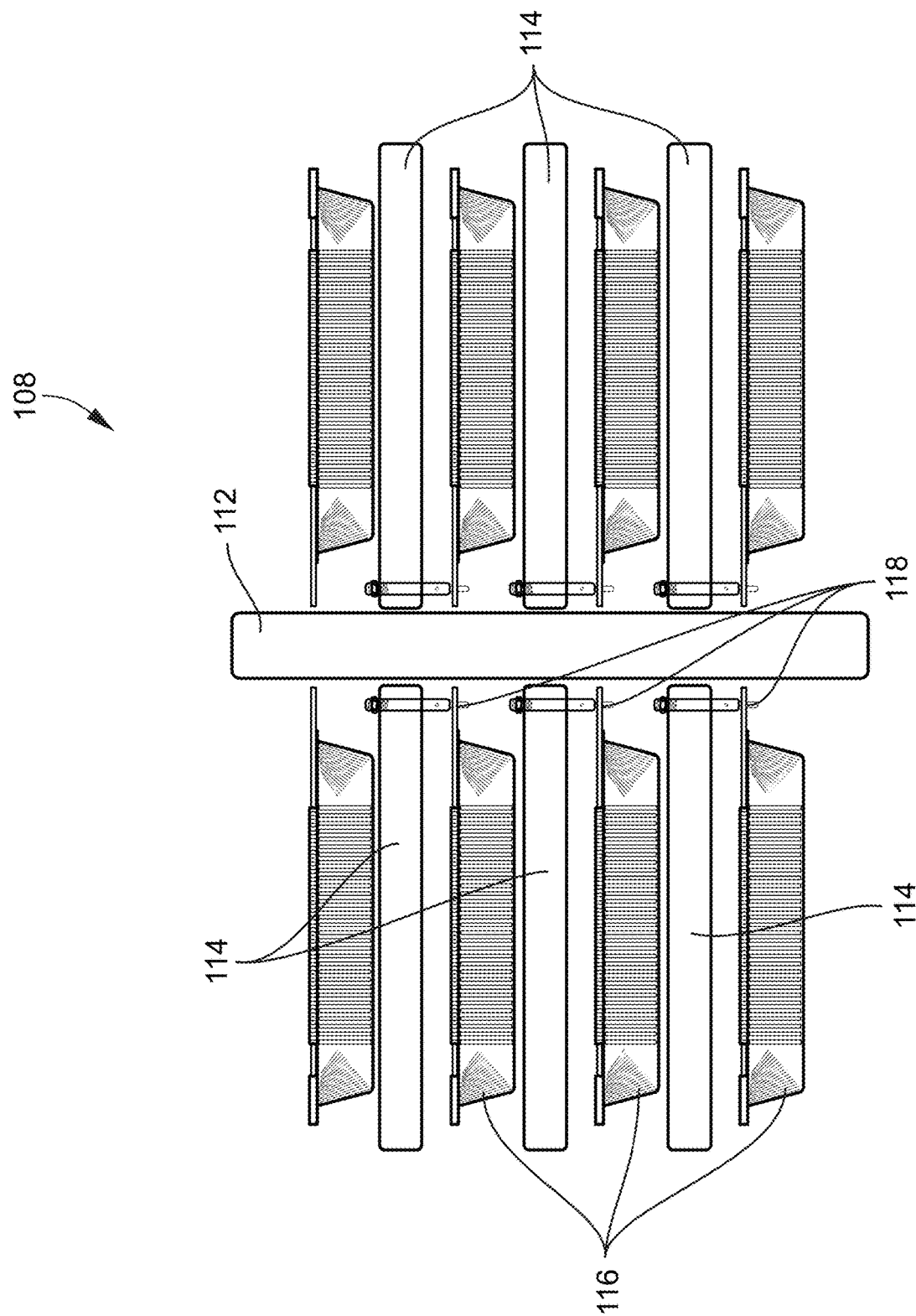
FIG. 3 is a schematic view of a rack frame suitable for use within the vending machine(s) of FIGS. 1 and 2, in accordance with aspects of the present subject matter.

Referring now to the drawings, FIGS. 1-3 illustrate views of exemplary embodiments of a vending machine system 100 adapted to open and prepare contained food items, in accordance with aspects of the present subject matter. More particularly, FIG. 1 illustrates a front schematic view of an exterior of a cabinet 101 defining a refrigerated compartment 108 and a preparation compartment 110, and FIG. 2 illustrates a front schematic view of an interior of a refrigerated compartment 108 and a preparation compartment 110 suitable for use with the system 100 of FIG. 1. FIG. 3 illustrates a schematic view of a rack frame 112 suitable for use within the exemplary system(s) 100 of FIGS. 1 and 2. However, it should be recognized that the rack frame 112 of FIG. 3 may be utilized in any other suitably configured vending machine system.

The system 100 generally includes a refrigerator associated with the refrigerated compartment 108. The system 100 can include additional components such as, but not limited to, thermal ducting, fans/blowers, power supplies, cabling, lighting, and insulation. The system 100 also includes conventional componentry such as a heat pump, compressor, heat exchanger, and the like. However, it should be appreciated that the refrigerated compartment 108 and the preparation compartment 110 may be utilized in any suitably configured vending machine system. Although exemplary embodiments of systems 100 and compartments 108, 110 are shown, it is anticipated that the present disclosure can be equally applicable to any suitably configured vending machine system for opening and/or preparing contained food items.

As shown particularly in FIG. 1, the exterior of the vending machine system 100 may include a touchscreen user interface 102, such as mounted within a main door. The main door may be equipped with a handle and lock operable for accessing the interior of the vending machine, e.g., to restock the refrigerated compartment 108 or to access various other internal components for servicing. The touchscreen user interface 102 may be a capacitance or resistive touchscreen operable for inputting customer selections, displaying information, programming the vending machine, etc. Adjacent the touchscreen user interface 102 is a payment subsystem 106 including card reader functionality and near field communication readability, among other functionality.

The vending machine system 100 further includes a delivery chute subassembly 104 for dispensing prepared food items to customers. For example, the delivery chute subassembly 104 may include delivery door configured to provide access to fully prepared food items. In one such embodiment, the delivery door may be configured to automatically open after a customer-selected food item is fully prepared. The vending machine system 100 may include additional features such as leveling feet and rolling casters. The exterior of the cabinet 101 may be branded or otherwise customized for each different owner/operator.

At least one of the touchscreen user interface 102 and the payment subsystem 106 may be communicatively coupled and may include a digital computer that, in terms of hardware architecture, generally includes a processor, input/output (I/O) interfaces, a network interface, a data store, and memory. A processor/controller may control the touchscreen, inventory management control system, and payment subsystems, among other components. It should be appreciated by those of ordinary skill in the art that a practical embodiment of a computer may include additional components and suitably configured processing logic to support known or conventional operating features that are not described in detail herein. The components may be communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The controller/processor may be a hardware device for executing software instructions. The controller/processor may be any custom made or commercially available processor, a central processing unit (CPU), an auxiliary processor among several processors associated with the server, or generally any device for executing software instructions. The controller/processor may be configured to execute software stored within the memory, to communicate data to and from the memory, and to generally control operations of the server pursuant to the software instructions. The I/O interfaces may be used to receive user input from and/or for providing system output to one or more system devices or components. User input may be provided via, for example, the touchscreen. System output may also be provided via the touchscreen. I/O interfaces may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface may be used to enable the server to communicate on a network, such as the Internet, a wide area network (WAN), a local area network (LAN), and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. The memory may have a distributed architecture where various components are accessed by the controller/processor. The software in memory may include one or more software programs, each of which includes an ordered listing of executable instructions for implementing logical functions. The software in the memory may include a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

Referring now to FIGS. 2 and 3, the system 100 may include a rack frame 112 supported relative to the cabinet 101. Generally, the rack frame 112 may be housed within the refrigerated compartment 108 of the cabinet 101. The system 100 includes at least one shelf 114 coupled to the rack frame 112 and configured to support a contained food item 116. Additionally, or alternatively, the system 100 may include two or more shelves 114, such as several shelves 114, coupled to the rack frame 112 for supporting an equal number of contained food items 116 or less, as illustrated. For example, the rack frame 112 and shelves 114 may be configured to hold contained food items 116 in one or more vertical stacks. Generally, each shelf 114 may define a storage position associated with the shelf 114.

However, it should be appreciated that the disclosure herein is equally applicable to suitably configured systems adapted to open and prepare any desired number of contained food items 116, in accordance with aspects of the present subject matter. Thus, additional or alternative embodiments of the system may include any number of shelves 114 desired or required. For instance, systems may include more shelves 114 than depicted in FIG. 2 or 3 or fewer shelves 114 than depicted in FIG. 2 or 3.

Referring still to the embodiments of FIGS. 2 and 3, the system 100 may include a lid removal apparatus 118 supported relative to the rack frame 112. More particularly, for the depicted embodiment, the system 100 includes multiple lid removal apparatuses 118. For instance, the system 100 may include a lid removal apparatus 118 associated with each shelf 114 of the system 100. Additionally, or alternatively, the system 100 may include a lid removal apparatus 118 for each shelf 114 currently supporting a contained food item 116. Generally, each removal apparatus 118 is configured to selectively retain a lid of an associated contained food item 116 supported by the respective shelf 114. In an additional or alternative embodiment, each lid removal apparatus 118 may be coupled to the rack frame 112. Additionally, or alternatively, each lid removal apparatus 118 may be coupled to an associated shelf 14 of the shelves 14.

As illustrated in FIG. 2, the system 100 may include a food item actuator 132 supported relative to the rack frame 112. The food item actuator 132 is generally configured to move one or more contained food items 116 from the shelves 114 (e.g., along direction 134). Referring now also to FIG. 19, a different schematic view of the rack frame 112 of FIG. 3 is illustrated in accordance with aspects of the present disclosure. Particularly, FIG. 19 illustrates the system 100 after the foot item actuator 132 has moved a container 150 of an associated contained food item 116 along direction 134. As shown, a lid 152 of the previously contained food item 116 may be retained by the associated lid removal apparatus 118. In additional or alternative embodiments, the food item actuator 132 is coupled to the rack frame 112.

The system 100 may also include an elevator 120 supported relative to the rack frame 112, such as within the refrigerated compartment 108. The elevator 120 includes a support surface such that the elevator 120 is configured to translate the support surface between each storage position of the shelves 114 and the passage position (e.g., along direction 130). In additional or alternative embodiments, the food item actuator 132 is configured to translate with the elevator 120. In additional or alternative embodiments, the food item actuator 132 is coupled to the elevator 120. For example, FIGS. 20 and 21 illustrate different schematic views of the rack frame 112 of FIGS. 3 and 19 in accordance with aspects of the present disclosure. Particularly, FIG. 20 illustrates the elevator 120, food item actuator 132, and the container 150 positioned at the associated shelf 114, and FIG. 22 illustrates the system 100 after the elevator 120, food item actuator 132, and the container 150 are transitioned from the position of the associated shelf 114 to the passage position (e.g., along direction 130).

As shown, the system 100 may include a partition 122 separating the refrigerated compartment 108 and the preparation compartment 110. The preparation compartment 110 may be at least partially thermally insulated from the refrigeration compartment 108. For instance, the partition 122 may include insulation, a vacuum, or the like in order to reduce heat transfer between the refrigerated compartment 108 and the preparation compartment 110. Generally, the partition 122 is configured to selectively allow access between the refrigerated compartment 108 and the preparation compartment 110, such as at a passage position generally located at an actuatable divider 126 associated with the partition 122. In one embodiment, the partition 122 may define a passage between the refrigerated compartment 108 and the preparation compartment 110 at the passage position (generally positioned at arrow 134 of FIG. 2).

Additionally, the system 100 may include the actuatable divider 126 configured to selectively actuate between one or more of a first orientation or position and one or more of a second orientation or position. Generally, the system 100 may be configured such that the preparation compartment 110 is accessible from the refrigeration compartment 108 when the actuatable divider 126 is in the first orientation and/or position. Further, the system 100 may be configured such that the preparation compartment 110 is not accessible from the refrigeration compartment 108 when the actuatable divider 126 is in the second orientation and/or position. For instance, in the exemplary system 100 of FIG. 2, the actuatable divider 126 includes a door translatable relative to the partition 122 such that the passage between the compartments 108, 110 is selectively accessible. For example, FIG. 22 illustrates a different schematic view of the rack frame 112 of FIGS. 3 and 21 in accordance with aspects of the present disclosure. Particularly, FIG. 22 illustrates a door of the actuatable divider 126 translated away from the passage position in order to allow food items to pass from the refrigerated compartment 108 to the preparation compartment 110. Additionally, or alternatively, the system may be configured such that the food item actuator 134 moves container 150 from the refrigerated compartment 108 to the preparation compartment 110. For example, as shown in FIG. 22, the food item actuator 132 may move container 150 from the refrigerated compartment 108, along direction 134, through the passage of the partition 122, and to the preparation compartment 110.

As shown, the system 100 may include an oven 124 disposed within the preparation compartment 110 of the cabinet 101. The oven 124 is generally configured to raise a temperature of the food item to a cooked temperature sufficient to reduce the risk of foodborne illness. A suitable oven for use with the present invention provides high-volume processing and can be customized to adjust cooking time based on the capacity of a thermal heating source(s), the food items to be heated, the starting temperature of the food items, an appropriated cooked temperature based on the food items, etc. For example, the oven 124 may include a microwave unit and a convection oven unit and/or an infrared oven unit.

In certain exemplary embodiments, the oven 124 may be configured to raise the temperature of the food item(s) to the cooked temperature in 30 seconds or less, such as between 25 and 30 seconds. For example, the oven 124 may include a high-speed convection oven, an infrared heating element, a microwave oven, or a combination of the preceding. The microwave unit may generally be utilized to raise the temperature of the food item(s) from the inside while the convection and/or infrared oven unit(s) are utilized to raise the temperature of the food item(s) from the outside. Additionally, or alternatively, the convection and/or infrared oven unit(s) may be used to sear at least a portion of the exterior surface(s) of the food item(s). It should be appreciated that prior removal of the lid 152 from the container 150 (e.g., via use of the lid removal apparatus 118) generally allows for use of convection and/or infrared oven unit(s) with precontained food items. In several embodiments, the oven 124 may include a commercial high-speed bake oven and/or a ventless rapid cook oven, such as the Turbochef™ manufactured Cheechef™, ventless high speed oven manufactured by Saco (e.g., model SACO 32A and/or SACO 16A), or other similar or suitably configured combination oven. Additionally, or alternatively, the oven 124 may be configured to operate at a suitable idle temperature, such as at or above 250 degrees Celsius, such as 260 degrees Celsius, such as 280 degrees Celsius. Additionally, or alternatively, the oven 124 may be configured to reach a back temperature in a suitable time period to provide customer satisfaction, such as 20 minutes or less, such as 15 minutes.

In several embodiments, as shown, the oven 124 is positioned at an oven location different than the passage position and/or the delivery subassembly 104. Thus, the system 100 may include a preparation elevator 128 positioned within the preparation compartment 110. The preparation elevator 128 may generally include a support surface and is configured to translate the support surface between the oven location and the passage position and/or the delivery subassembly 104 (e.g., along direction 135 of FIG. 22).

Referring now to FIGS. 23 and 24, different schematic views of the rack frame 112 of FIGS. 3 and 22 are illustrated in accordance with aspects of the present disclosure. Particularly, FIG. 23 illustrates the preparation elevator 128 positioned such that the support surface and/or the opened food item is located within oven 124, and FIG. 24 illustrates the system 100 after the food item has been fully prepared and the container 150 and preparation elevator 128 translate from the oven location to the delivery chute subassembly 104, for dispensing the prepared food item(s) to the customer. Additionally, or alternatively, the actuatable divider 126 may be actuated to close the passage between the compartments 108, 110 after the container 150 is moved from the refrigerated compartment 108 to the preparation compartment 110. For example, the door of the actuatable divider may be translated to close the passage prior to or simultaneously with moving the container 150 into the oven 124 (e.g. along direction 135). Once the temperature of the food items in the oven 124 have been raised to a cooked temperature, the preparation elevator 128 translates the support surface and associated container 150 to the delivery chute subassembly 104 (e.g., along direction 135). As shown, the location of the delivery chute subassembly 104 may be at or approximately at the passage of the partition 112 and/or the actuatable divider 126.

Figure 5:
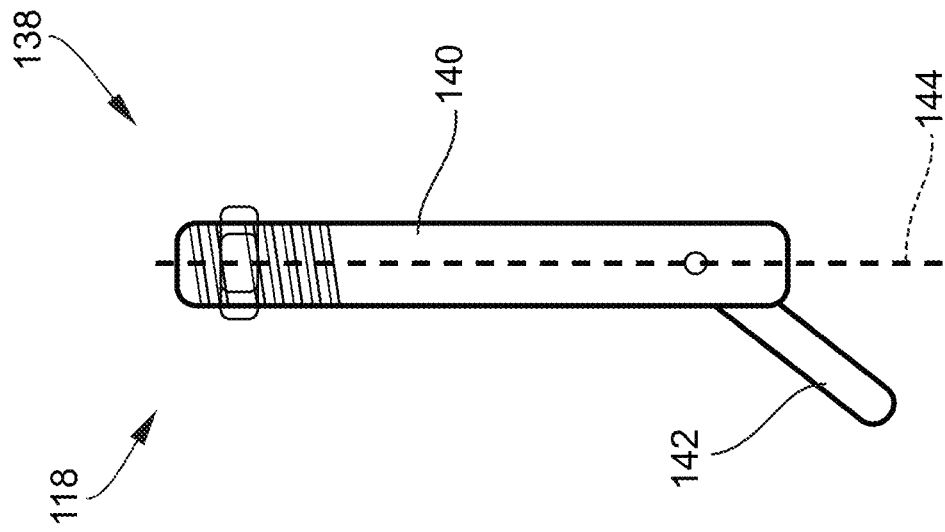
FIG. 5 is another schematic view of the lid removal apparatus in accordance with aspects of the present subject matter.
Figure 4:
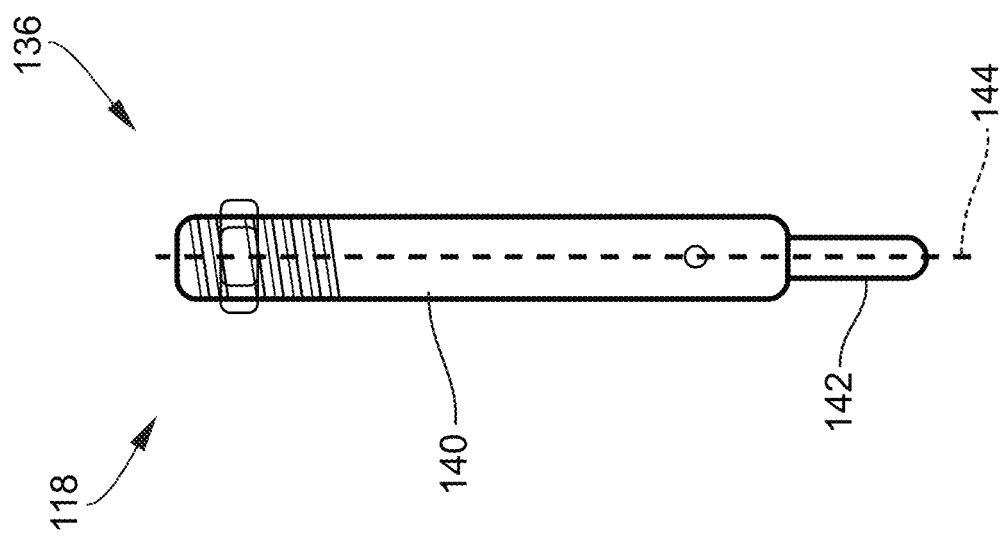
FIG. 4 is a schematic view of a lid removal apparatus in accordance with aspects of the present subject matter.
Figure 6:
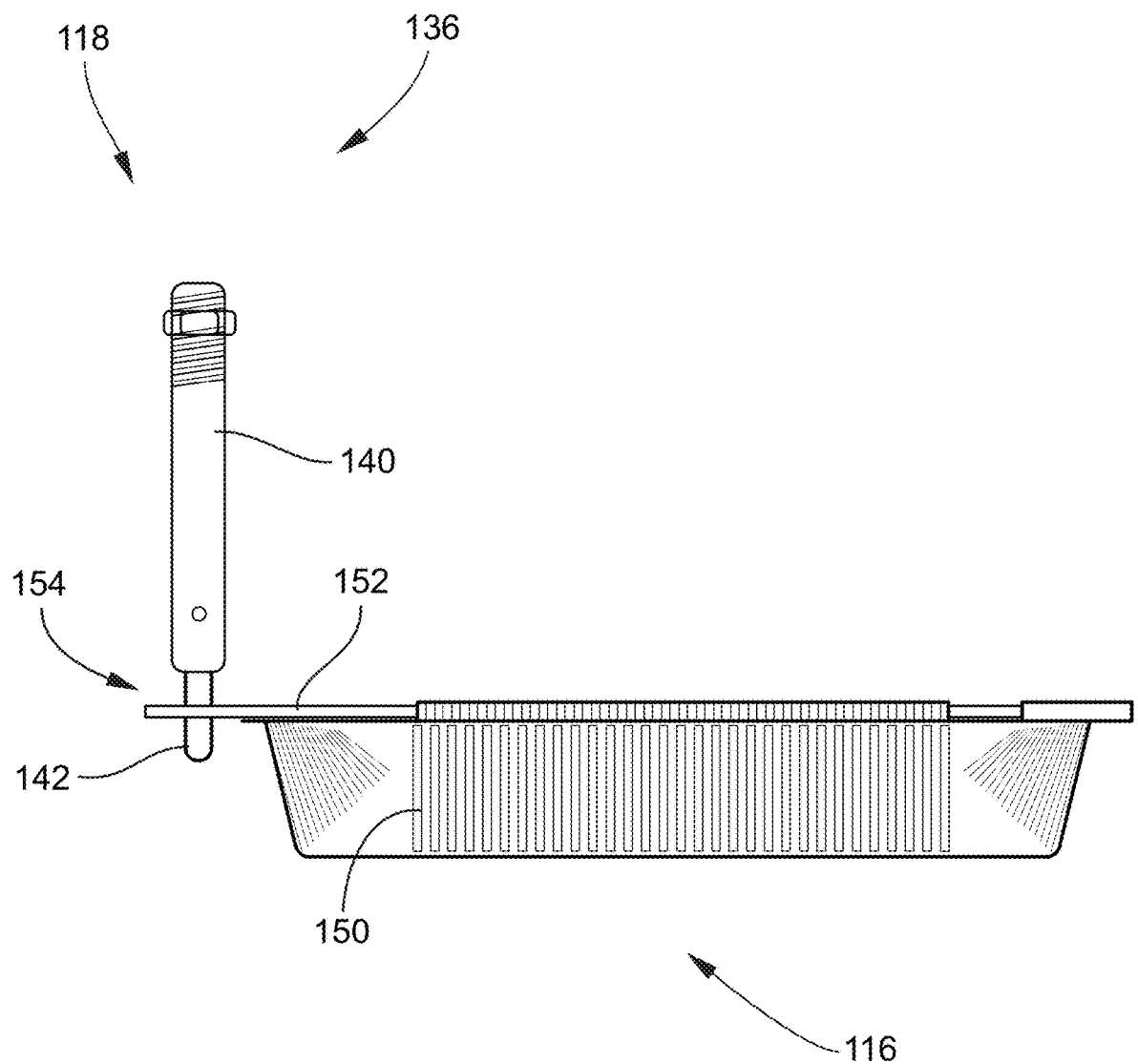
FIG. 6 is a schematic view of the lid removal apparatus engaged with a container in accordance with aspects of the present subject matter.
Figure 7:
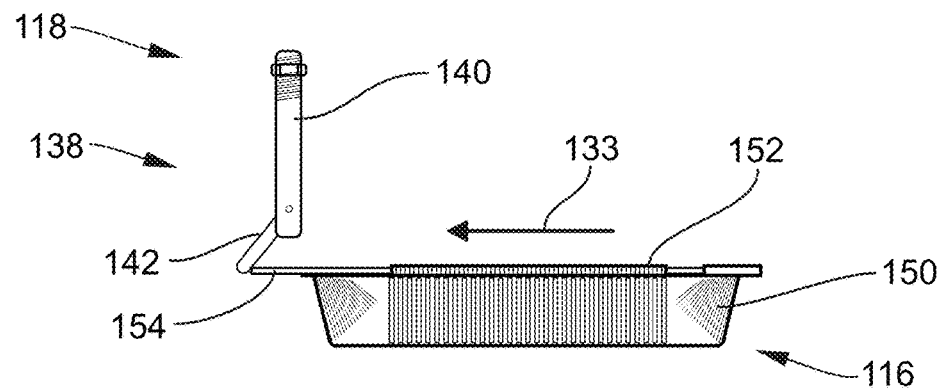
FIG. 7 is a schematic view of the lid removal apparatus being loaded on a shelf of the rack frame in accordance with aspects of the present subject matter.
Figure 8:
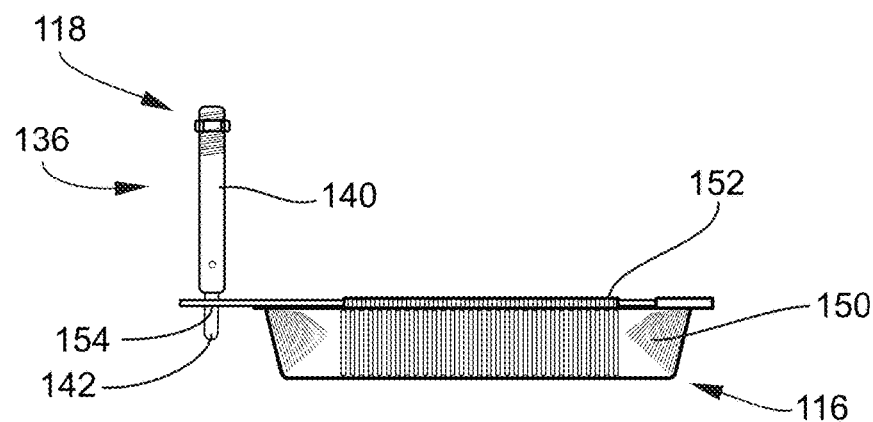
FIG. 8 is another schematic view of the lid removal apparatus engaged with the container in accordance with aspects of the present subject matter.

Referring now to FIGS. 4-9, exemplary embodiments of lid removal apparatus 118 suitable for use with the exemplary rack frames 112 of FIGS. 2 and 3 and the exemplary vending machine system(s) 100 of FIGS. 1 and 2 are illustrated in accordance with aspects of the present subject matter. However, it should be recognized that the embodiment(s) of removal apparatus 118 of FIGS. 4-9 may be utilized in association with any suitably configured rack frame and/or in any other suitably configured vending machine system. In the depicted embodiments, the lid removal apparatus 118 includes a movable arm 142 and a stationary arm 140. Thus, the movable arm 142 of the lid removal apparatus 118 may be configured to actuate between a load position 138 (as depicted in FIGS. 5 and 7) and an engagement position 136 (as depicted in FIGS. 4, 6, 8 and 9). As shown in FIG. 4, the movable arm 142 may be aligned with an axis 144 of the stationary arm 140 when in the engaged position 136. However, when in the load position 138, the movable arm 142 may be biased, oriented, or the like away from the axis 144 of the stationary arm 140, see, e.g., FIG. 5.

Generally, contained food item(s) 116 may include a container 150 that holds and transports one or more food items and a lid 152 retained relative to the container 150 in order to extend the freshness or shelf life of the food item(s). As shown, the exemplary lid removal apparatus 118 may include a protrusion configured to selectively engage with the lid 152 of an associated contained food item 116. For example, the movable arm 142 may be configured to engage with a through hole 154 of the lid 152. For example, as shown in FIG. 7, a contained food item 116 may be stored on an associated shelf 114 via movement in a load direction 133. Movement of the contained food item 116 and the through hole 154 generally causes the movable arm 142 to engage with the through hole 154, see e.g., FIG. 8. Additionally, or alternatively, the movable arm 142 may be biased opposite to the load direction 133 (e.g., to align with the axis 144 of the stationary arm 140) in order encourage the movable arm 142 to engage with the through hole 154.

Figure 9:
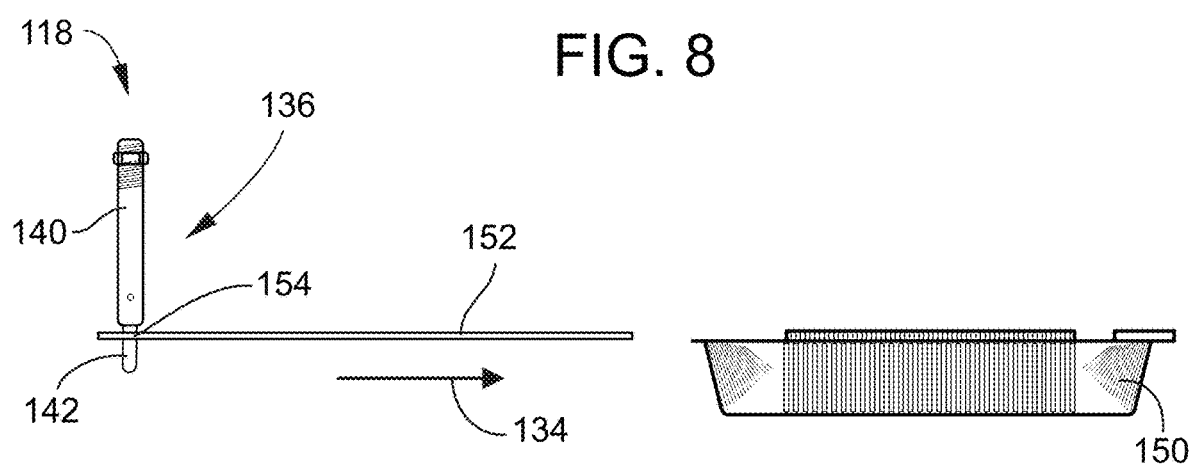
FIG. 9 is a schematic view of the a lid being retained by the lid removal apparatus in accordance with aspects of the present subject matter.

As shown in FIG. 9, the lid removal apparatus 118 is configured to retain the lid 152 of the contained food item 116 subsequent to dispensing the food item to the customer. For example, moving the container 150 in a vending direction 134 may cause the movable arm 142 of the lid removal apparatus 118 to retain the lid 152 via engagement with the through hole 154. Referring now to FIGS. 10 and 11, top schematic views of an exemplary contained food item 116 suitable for use with the lid removal apparatus 18 of FIGS. 4-9 are illustrated in accordance with aspects of the present subject matter. For example, the contained food item 116 includes a container 150 and a lid 152 selectively retained by the container 152. Particularly, FIG. 10 illustrates the contained food item 116 with a removable lid 152, and FIG. 11 illustrates the contained food item 116 after removal of the lid 152. As shown, the container 150 may include two or retention mechanisms 156 configured to slidably retain the lid 152. Thus, when the container 150 is translated along direction 134, the lid 152 is removed from the container 150.

Referring now to FIGS. 12-14, schematic views of embodiments of a shelf 114 are illustrated in accordance with aspects of the present disclosure. More particularly, the shelf 114 may be utilized with the exemplary rack frames 112 of FIGS. 2 and 3 and the exemplary vending machine systems of FIGS. 1 and 2. However, it should be recognized that the shelf 114 of FIGS. 12-14 may be utilized in association with any suitably configured rack frame and/or in any other suitably configured vending machine system. As shown, the shelf 114 may include at least one, such as two or more, such as several, frame pieces 160 and a storage surface 158. Generally, the frame piece(s) 160 may be coupled to the rack frame 112 and support the storage surface 158, which is generally configured to support an associated contained food item 116, excluded for clarity. In additional or alternative embodiments, the lid removal apparatus(es) 118 may be coupled to the shelf(ves) 118. For example, as shown, each lid removal apparatus 118 may be coupled to a frame piece 160. More particularly, in the depicted embodiment, the lid apparatus 118 may be fixed relative to the shelf 114. Additionally, or alternatively, each lid removal apparatus 118 may include a hook structure 118 configured to engage with the associated lid 152 of the associated contained food item 116.

Figure 15:
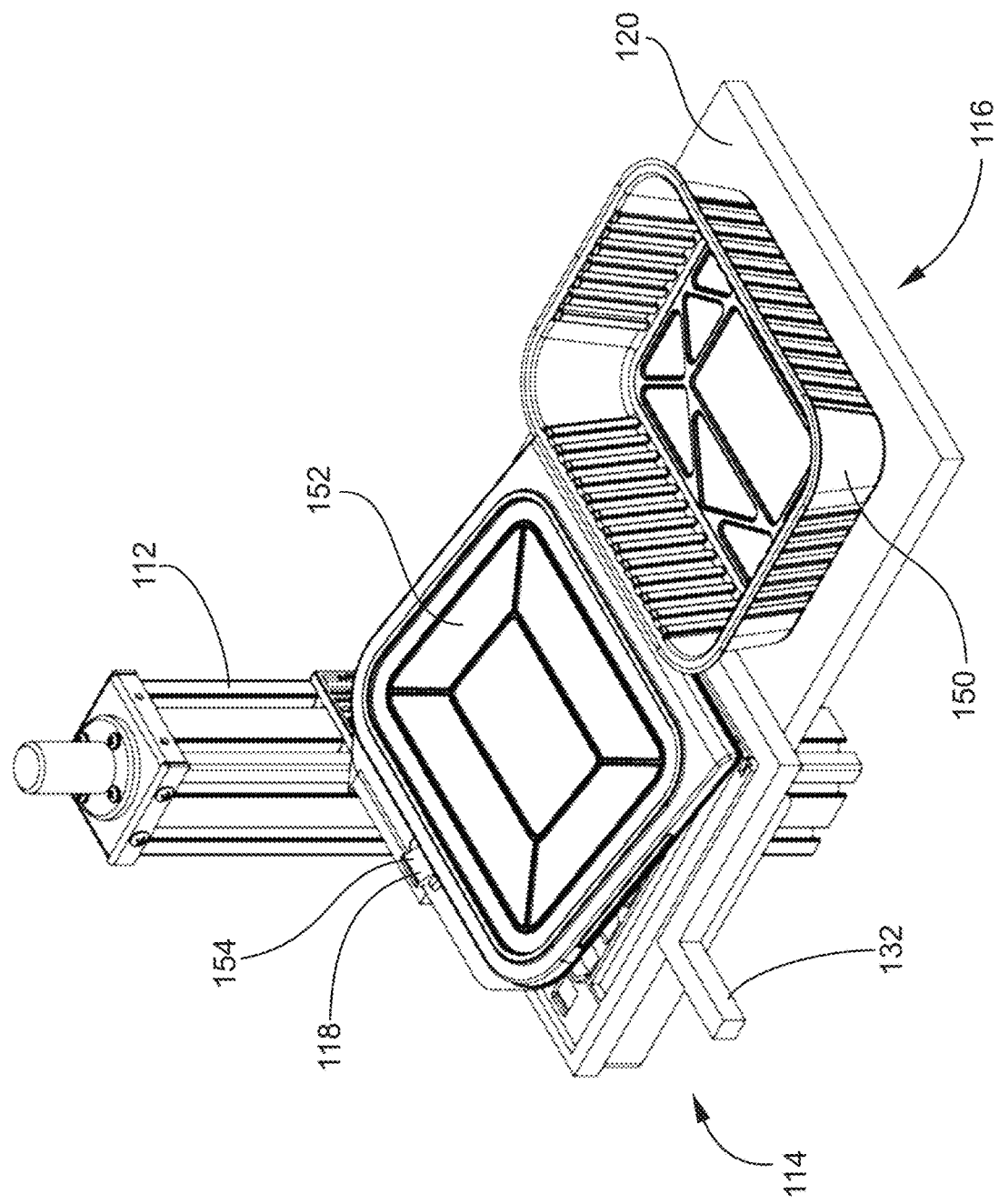
FIG. 15 is a schematic view of the a lid being retained by the lid removal apparatus in accordance with aspects of the present subject matter.
Figure 16:
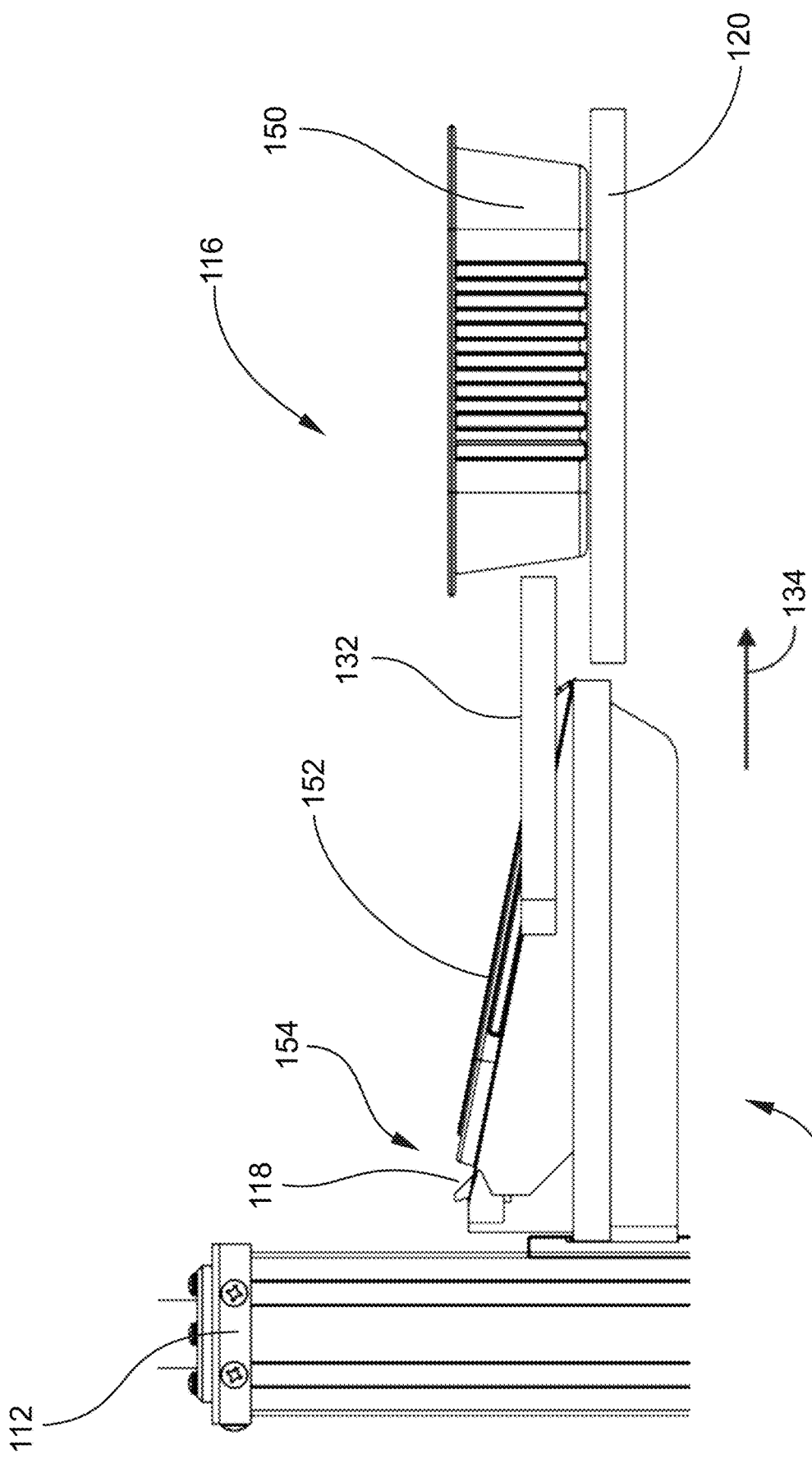
FIG. 16 is another schematic view of the lid being retained by the lid removal apparatus in accordance with aspects of the present subject matter.

Referring now to FIGS. 15 and 16, exemplary embodiments of lid removal apparatus 118 and food item actuator 132 suitable for use with the exemplary rack frames 112 of FIGS. 2 and 3 and the exemplary vending machine system(s) of FIGS. 1 and 2 are illustrated in accordance with aspects of the present subject matter. Particularly, FIGS. 15 and 16 illustrate a lid removal apparatus 118 including a hook structure that may be utilized in association with the shelf of FIGS. 12-14. However, it should be recognized that the food item actuator 132 of FIGS. 15 and 16 may be utilized in association with any suitably configured lid removal apparatus (such as the exemplary apparatus 118 of FIGS. 4-9), rack frame, shelf, and/or in any other suitably configured vending machine system. As shown, the hook structure of the lid removal apparatus 118 may be configured to engage with a slot 154 of the lid 152 and retain the lid 152.

Additionally, or alternatively, the food item actuator 132 may include an arm translatable relative to the lid removal apparatus 118. Moreover, the system 100 may be configured such that translation of the arm relative to a selected lid removal apparatus 118 moves a container 150 of the associated contained food item 116 from the associated shelf 114 to the support surface of the elevator 120 (e.g., along direction 134 as shown in FIG. 19). As shown, a lid 152 of the previously contained food item 116 may be retained by the associated lid removal apparatus 118 subsequent to translation of the arm of the food item actuator 132. Additionally, or alternatively, the system 100 may be configured such that translation of the arm moves the container 150 of the contained from the refrigerated compartment 108 to the preparation compartment 110 of the cabinet 101 (e.g., along direction 134 as shown in FIG. 22). In at least one embodiment, as shown, the arm of the food item actuator 132 may be configured as a pusher arm.

Figure 18:
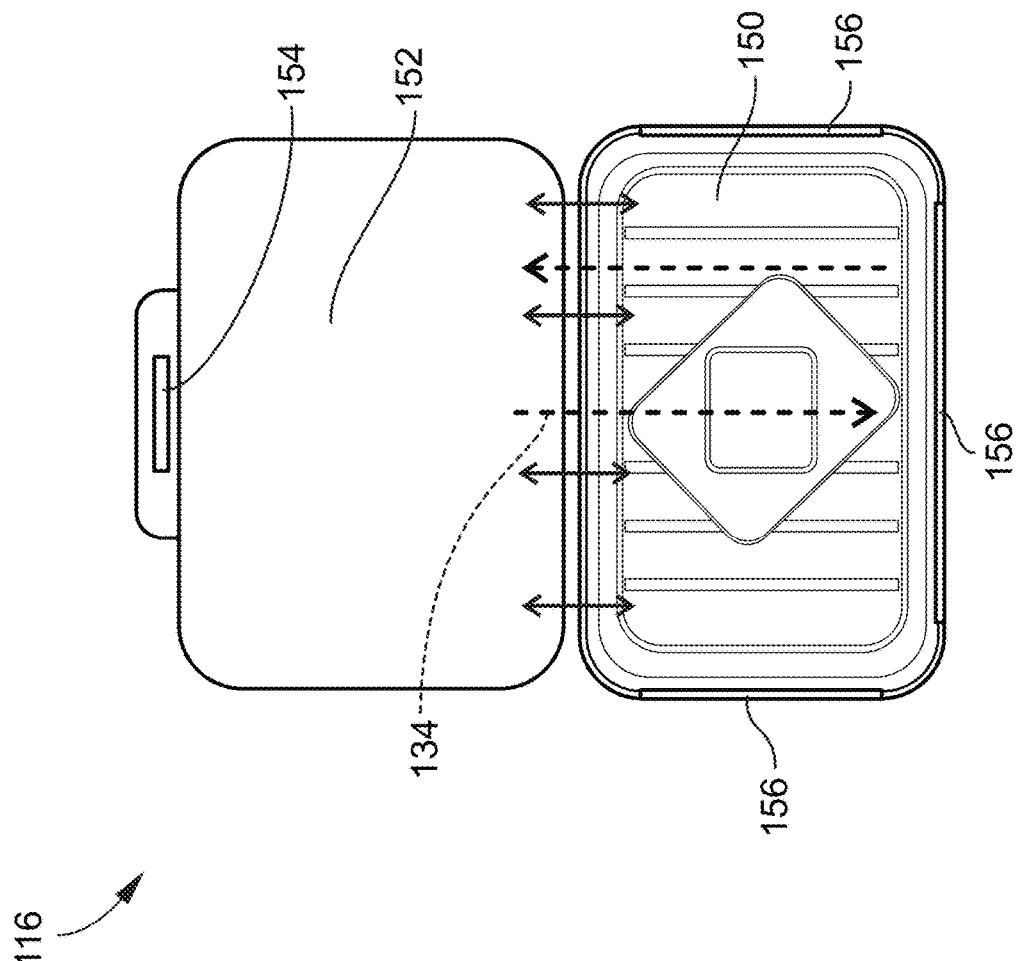
FIG. 18 is another, top schematic view of the contained food item being opened in accordance with aspects of the present subject matter.
Figure 17:
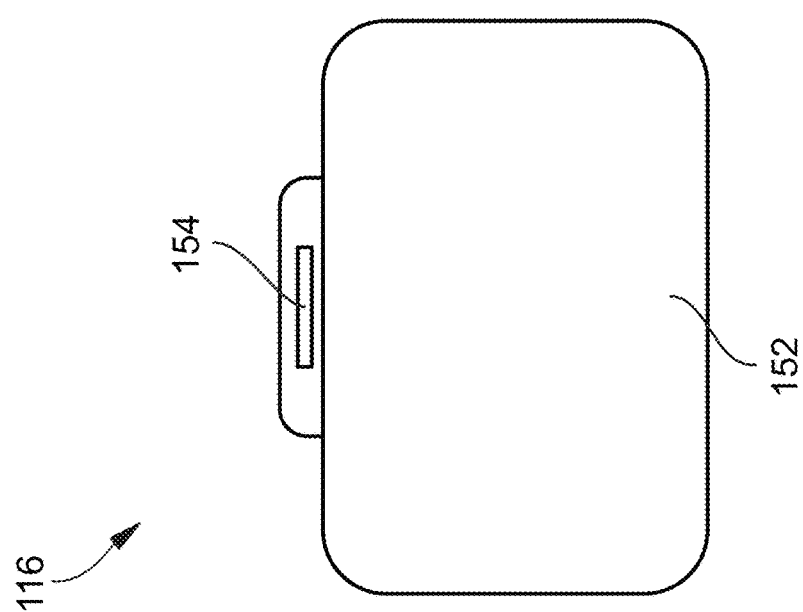
FIG. 17 is a top schematic view of an additional or alternative contained food item in accordance with aspects of the present subject matter.

Referring now to FIGS. 17 and 18, top schematic views of additional, or alternative, exemplary contained food item 116 suitable for use with the lid removal apparatuses 18 of FIGS. 12-16 are illustrated in accordance with aspects of the present subject matter. The contained food item 116 of FIGS. 17 and 18 may generally be configured the same or similar to the exemplary contained food item 116 of FIGS. 10 and 11. For example, the contained food item 116 includes a container 150 and a lid 152 selectively retained by the container 152. Particularly, FIG. 17 illustrates contained food item 116 with a removable lid 152, and FIG. 18 illustrates the contained food item 116 after removal of the lid 152. As shown, the container 150 may include two or more retention mechanisms 156 configured to slidably retain the lid 152. Thus, when the container 150 is translated along direction 134, the lid 152 is removed from the container 150.

However, unlike the contained food item of FIGS. 10 and 11, the lid 152 of FIGS. 17 and 18 includes a slot 154 rather than a through hole. The slot 154 may generally engage with the hook structure of the lid removal apparatus(es) 118 of FIGS. 12-16 and/or a similarly configured lid removal apparatus 118.

The rack frame 112 is adapted to be loaded with precontained food. Further, the system 100 is generally configured such that the precontained food is automatically opened and heated to a cooked temperature without consumer contact. The vending machine system 100 allows a food item supplier to operate and stock the vending machine under sanitary conditions, thereby eliminating any intermediate handling of the food items. In an exemplary configuration, the vending machine is configured to sell freshly cooked food from frozen food items. Food items suitable for use with the present invention include any contained food item having any size or shape. The rack frame 112, shelves 114, lid removal apparatuses 118, containers 150, and/or lids 152 can be customized based on the food item to be dispensed. Exemplary embodiments of vending machine system 100 disclosed here have the ability to cook and vend a potentially unlimited number of food items and may do so fully automated.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A vending machine system adapted to open and prepare a contained food item, the system comprising:
    a cabinet including a refrigerated compartment, a preparation compartment, and a partition separating the refrigerated compartment and the preparation compartment, the partition configured to selectively allow access between the refrigerated compartment and the preparation compartment;
    a rack frame supported relative to the cabinet and housed within the refrigerated compartment;
    a shelf coupled to the rack frame, the shelf configured to support the contained food item;
    a lid removal apparatus supported relative to the rack frame, the lid removal apparatus configured to selectively retain a lid of the contained food item; and
    a food item actuator supported relative to the rack frame, the food item actuator including an arm translatable relative to the lid removal apparatus, wherein the system is configured such that translation of the arm moves a container of the contained food item from the refrigerated compartment to the preparation compartment of the cabinet, and wherein the system is configured such that the lid of the contained food item is retained by the lid removal apparatus subsequent to translation of the arm, wherein the lid removal apparatus is coupled to the rack frame.

2. The system of claim 1, wherein the partition includes an actuatable divider, and wherein the divider is configured to selectively actuate between at least one of a first orientation or position and at least one of a second orientation or position.

3. The system of claim 1, wherein the lid removal apparatus is coupled to the shelf.

4. The system of claim 1, wherein the lid removal apparatus includes a protrusion configured to selectively engage with a through hole of the lid.

5. The system of claim 1, wherein the lid removal apparatus includes a hook structure configured to engage with a slot of the lid.

6. The system of claim 1, wherein the food item actuator is coupled to the rack frame.

7. The system of claim 1, wherein the arm of the food item actuator is configured as a pusher arm.

8. The system of claim 1, wherein the lid removal apparatus includes a movable arm and a stationary arm.

9. The system of claim 8, wherein the movable arm of the lid removal apparatus is configured to actuate between a load position and an engagement position.

10. The system of claim 1, further comprising:
    an oven disposed within the preparation compartment of the cabinet.

11. The system of claim 10, wherein the oven is configured to raise a temperature of the food to a cooked temperature sufficient to reduce the risk of foodborne illness.

12. A vending machine system adapted to open and prepare contained food items, the system comprising:
    a cabinet including a refrigerated compartment, a preparation compartment, and a partition separating the refrigerated compartment and the preparation compartment, the partition configured to selectively allow access between the refrigerated compartment and the preparation compartment at a passage position;
    a rack frame supported relative to the cabinet and housed within the refrigerated compartment;
    a plurality of shelves coupled to the rack frame, each shelf of the plurality of shelves configured to support an associated contained food item at an associated storage position;
    a plurality of lid removal apparatuses supported relative to the rack frame, each lid removal apparatus of the plurality of lid removal apparatuses configured to selectively retain a lid of the associated contained food item of an associated shelf of the plurality of shelves; and
    an elevator supported relative to the rack frame and including a support surface, wherein the elevator is configured to translate the support surface between each storage position of the plurality shelves and the passage position;
    a food item actuator supported relative to the rack frame, the food item actuator including an arm translatable relative to each lid removal apparatus, wherein the system is configured such that translation of the arm relative to a selected lid removal apparatus moves a container of the associated contained food item from the associated shelf to the support surface of the elevator, wherein the system is configured such that the lid of the associated contained food item is retained by the selected lid removal apparatus of the associated shelf subsequent to translation of the arm.

13. The system of claim 12, wherein each lid removal apparatus of the plurality of lid removal apparatuses is coupled to the associated shelf of the plurality of shelves.

14. The system of claim 12, wherein each lid removal apparatus of the plurality of lid removal apparatuses includes a hook structure configured to engage with a slot of the associated lid of the associated contained food item.

15. The system of claim 12, wherein the food item actuator is further configured such that translation of the arm moves the container of the associated contained food item from the refrigerated compartment to the preparation compartment of the cabinet.

16. The system of claim 12, wherein the food item actuator is configured to translate with the elevator.

17. The system of claim 12, wherein the food item actuator is coupled to the elevator.

18. The system of claim 12, further comprising:
an oven disposed within the preparation compartment of the cabinet.

19. The system of claim 18, wherein the oven is positioned at an oven location, the oven location different than the passage position, the system further comprising:
a preparation elevator positioned within the preparation compartment and including a support surface, wherein the preparation elevator is configured to translate the support surface of the preparation elevator between the oven location and the passage position.

\* \* \* \* \*